Aug. 9, 1960 G. W. SINGLEBACK 2,948,774

COLOR KILLER SYSTEM

Filed Feb. 2, 1955

INVENTOR.
GEORGE W. SINGLEBACK
BY
[signature]
ATTORNEY

United States Patent Office 2,948,774

Patented Aug. 9, 1960

2,948,774

COLOR KILLER SYSTEM

George W. Singleback, Pennsauken, N.J., assignor to Radio Corporation of America, a corporation of Delaware Filed Feb. 2, 1955, Ser. No. 485,681

10 Claims. (Cl. 178—5.4)

Figures 1, 2:
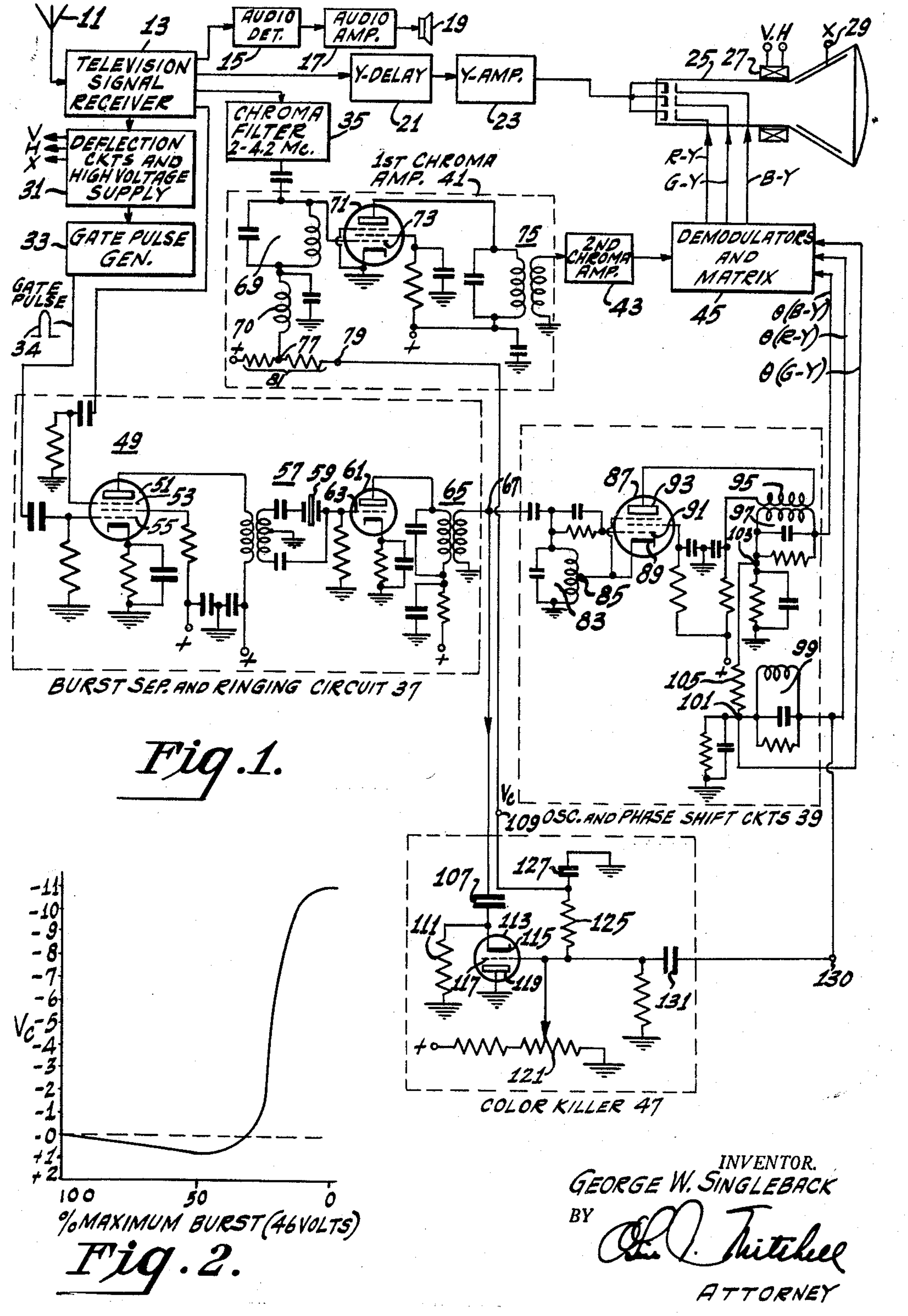

The present invention relates to color killer circuits and circuits for the automatic control of the gain of the chrominance channel in a color television receiver.

In the color television signal conforming to present standards, there is included a luminance signal which describes the luminance or monochrome information in the transmitted color image. The luminance signal has frequency components up to 4.2 mcs. In addition, there is included a chrominance signal having frequency components from 2 to 4 mcs. and color synchronizing bursts which provide reference phase information which permit the demodulation of the chrominance signal by the processes of synchronous demodulation.

If a monochrome signal is received by a color television receiver, the monochrome signal will be processed in appropriate luminance signal channels and reproduced in shades of gray from black to white on the color image reproducer. However, since the monochrome signal may have higher frequency components in the frequency range of the chrominance signal, it is highly important that none of these higher frequency components find their way through the chrominance channel of the color television receiver in a manner which would cause spurious color response on the color image reproducer.

The presence or the absence of the color synchronizing bursts yields an indication as to whether an incoming television signal is one representing color television signal transmission or monochrome television signal transmission. A color killer circuit may therefore be utilized for turning off the chrominance channels in the color television receiver when the color synchronizing bursts are absent.

It is therefore an object of this invention to provide an improved and simplified color killer circuit for use in a color television receiver.

It is still another object of this invention to provide a color killer circuit which operates to disable the chrominance amplifier when the local color demodulation oscillator is out of proper phase.

According to this invention, a color killer control of the chrominance channel in a color television receiver is provided by developing a substantially continuous signal at the frequency of the color synchronizing bursts whenever the color synchronizing bursts are present. The output of the continuous signal developing circuit is used in combination with the output of a local color demodulating oscillator, which is phase locked by the continuous signal when present, for turning on the chrominance amplifier when the continuous signal is present and for disabling the chrominance amplifier in the absence of the continuous signal developed from the burst. In addition, the chrominance amplifier is disabled when the local color demodulation oscillator is improperly phased by utilizing a comparison of the phase of the local color demodulation oscillator with the phase of the continuous signal developed from the incoming burst.

Other and incidental objects of the invention will become apparent upon a reading of the following specification and a study of the accompanying drawings in which:

Figure 1 shows a diagram of a color television receiver including schematic circuits of the color killer, of the chrominance amplifiers, the burst separator and ringing circuit, and the oscillator and phase shift circuits; and Figure 2 describes the output voltage which is developed by the color killer as a function of the burst voltage amplitude.

Consider first the operation of the color television receiver circuit which is shown in Figure 1. The incoming color television signal arrives at the antenna 11 of the television signal receiver 13. The television signal receiver 13 provides the functions of first detection, intermediate frequency amplification, second detection, automatic gain control, adjacent and co-channel interference suppression, and many other functions which are described in detail by Antony Wright in his paper entitled "Television Receivers" as published in the March 1947 issue of the RCA Review.

The output of the television signal receiver 13 yields the recovered television signal to at least five branches of the color television receiver.

One branch provides the demodulation of the sound information by use, for example, of an intercarrier sound circuit. The sound or audio signal is then detected in the audio detector 15, amplified in the audio amplifier 17, and applied to the loud speaker 19.

Another branch to which the recovered color television signal is applied, constitutes the deflection circuits and high voltage supply 31 which supplies an ultor voltage to the ultor 29 of the color image reproducer 25, and vertical and horizontal deflection signals to the yokes 27, and an excitation signal which is applied to the gate pulse generator 33. The gate pulse generator 33, in response to the excitation signal provided by the deflection circuits and high voltage supply 31, provides a gate pulse 34 to the burst separator and ringing circuit 37. The gate pulse 34 has the duration interval of at least that of a color synchronizing burst and occurs in time coincidence with a correspondingly timed color synchronizing burst. The recovered color television signal is also fed to the burst separator and ringing circuit 37. Utilizing the gate pulse 34, the burst separator and ringing circuit 37 separates the color synchronizing burst from the recovered color television signal and develops a continuous signal having the phase and frequency of the color synchronizing bursts. This continuous signal, as provided by the burst separator and ringing circuit 37, is applied to the oscillator and phase shift circuit 39 wherein it is utilized for locking the phase and frequency of a local oscillator which in turn provides suitably phased synchronous demodulating signals to the demodulator and matrix 45.

The recovered color television signal is also applied to the chroma filter 35 which has a pass band from substantially 2 to 4.2 mcs. thereby eliminating luminance signal components below 2 mcs. The output of the chroma filter 35 is then substantially the chrominance signal; this signal is applied to the first chroma amplifier 41 wherein the chrominance signal is amplified to a first prescribed level. The amplified chrominance signal is again amplified in the second chroma amplifier 43 to a signal level which is suitable for employment in the processes of demodulation. The chrominance signal is then applied to the demodulator and matrix 45 to which are also applied the aforementioned synchronous demodulating signals as provided by the oscillator and phase shift circuit 39. The output of the demodulator and matrix 45 consists of red, green and blue color difference signals denoted as $R-Y$, $G-Y$ and $B-Y$ where Y denotes the luminance signal. For a detailed discussion of the operation and design of demodulators and matrices of the type which may be employed as the demodulator and matrix 45, see, for example, the publication entitled "Color Television Signal Receiver Demodulators" by Pritchard and Rhodes, as published in the June 1953 issue of the RCA Review.

The final branch to which the recovered color television signal is applied is the luminance signal channel. The luminance signal channel consists of the Y delay line 21 and the Y amplifier 23 which delays and amplifies the luminance signal to prescribed amounts with the resulting amplified luminance signal then applied to the cathodes of the color image reproducer 25. At the same time the color difference signals $R-Y$, $G-Y$ and $B-Y$ are applied to respective control grids of the color image reproducer 25. The luminance and the color difference signals are added together in the electron guns of color image reproducer to yield the R, G and B component color signals within the color image reproducer. These component color signals, in conjunction with the deflection signals provided to the deflection yokes 27, provide for a reconstruction of the televised color image or the televised monochrome image depending upon whether the transmission is a color transmission or a monochrome transmission.

Control of the pass or stop characteristics of the chrominance channel may be achieved by control of the gain of the first chroma amplifier 41. In this amplifier the incoming chrominance signal from the chroma filter 35 is coupled to the resonant circuit 69 having pass band characteristics which are suitable for the transmission of signals in the frequency band of the chrominance signal. This resonant circuit 69 is coupled to the control grid 73 of the electron tube 71. The resonant circuit 69 is also coupled through the choke 70 to the voltage divider 81 to which a bias voltage will be applied by the color killer 47. If the color killer 47 provides a sufficiently negative bias to the terminal 79 of the voltage divider 81, the electron tube 71 will be biased beyond cut-off and no signals appearing across the resonant circuit 69 will be developed in the output circuit 75.

Consider next the operation of the burst separator and ringing circuit 37. In the burst separator 49, the gate pulse 34 is applied to the control grid 55 of the electron tube 51; the recovered color television signal is applied to the third control grid 53 of this electron tube 51. During the duration of the gate pulse 34, the potential of the control grid 55 is raised to a point whereby the electron tube 51 conducts and the color synchronizing burst, which is applied to the third control grid 53 during this time, will be developed in the output circuit 57. The output circuit 57 includes the piezo-electric crystal 59 which, due to excitation by the color synchronizing burst when present will ring at the burst frequency and phase and provide what is substantially a constant amplitude ringing signal which will exist at least during the scanning line following the color synchronizing burst. This signal is developed at fairly low levels; the continuous signal developed by piezo-electric crystal 59 is then applied to the control grid 63 of the tube 61 and amplified into the resonant circuit 65 so that an amplified continuous ringing signal corresponding to the oscillations developed in the piezo-electric crystal 59 will be realized at the terminal 67.

The continuous ringing voltage provided at the output terminal 67 is then applied to the resonant circuit 83 which forms a resonator of an electron coupled oscillator circuit utilizing the resonant circuit 83 and the electron tube 87. A suitable tap 85 on the inductance of the resonator 83, coupled to the cathode 89, provides electron coupled type of oscillator operation. The anode 93 of the electron tube 87 is coupled through the inductance 95 into the resonant circuit 97 which is in turn coupled to the resonant circuit 99. By proper choice of circuit parameters and the tuning of the resonant circuits 97, 99 and the coupling coefficients existing between these circuits and between these circuits and the inductance 95, a synchronous detection signal at the $B-Y$ phase will be furnished by the resonant circuit 97, with the synchronous detection signal at the $R-Y$ phase furnished by the resonant circuit 99. The resonant circuits 97 and 99 may then be coupled together by the resistor 105 to provide a synchronous demodulating signal having the $G-Y$ phase at the terminal 103.

It is to be noted that when the bursts are present, the output of the burst separator ringing circuit 37 is a continuous ringing signal of substantially constant amplitude which is utilized to injection lock the phase and frequency of the electron coupled oscillator circuit which is coupled between the cathode 89 and the control grid 91 of the electron tube 87 utilizing the resonant circuit 83. In many types of injection lock circuits, it would be sufficient to merely inject the color synchronizing burst into an oscillator resonant circuit or to develop the color synchronizing bursts at the control electrode of the oscillator. However, the development of a continuous signal in response to the color synchronizing burst provides a signal of improved characteristics for injection locking.

The continuous ringing signal furnished at the output terminal 67 whenever the color synchronizing burst is present, is then passed through the condenser 107 onto the cathode 115 of the triode 113 in the color killer 47. Triode 113 contains a grounded anode 119. The output signal of the oscillator and phase shift circuit 39 as provided at the terminal 130, is applied through the condenser 131 to the control grid 117 of the triode 113. When the color synchronizing bursts are present, the output signal of the oscillator as impressed on the control grid 117, will have the frequency and phase of the color synchronizing bursts.

The color killer 47 functions in the following manner. When color synchronizing bursts are present, the phases between the continuous ringing voltage developed at the cathode 115 and the oscillator voltage provided at the control grid 117 of the triode 113, will be such that the control grid 117 of the triode 113 will draw a minimum current. However, when no color synchronizing bursts are present, the only alternating current voltage applied to the triode 113 will be the oscillator voltage, this oscillator voltage being free-running and not synchronized. By adjustment of the bias voltage provided by the potentiometer 121, to the control grid 117, a condition of operation for the triode 113 may be realized whereby the grid 117 will draw current from the positive peaks of the oscillator voltage. The drawing of current in positive peaks by the control grid 117 will cause the development of a negative voltage at the output terminal 109; this negative voltage will be developed by the action of the resistor 125 and the condenser 127 forming a grid-leak type of detection circuit.

Thus, when no color synchronizing bursts are present, signifying monochrome transmission, a negative voltage $V_c$ will be developed at the output terminal 109. This negative voltage $V_c$ will be furnished to the terminal 79 of the voltage divider 81 of the first chroma amplifier 41 to cut off the amplification of the electron tube 71 thereby completely cutting off transmission through the entire chrominance channel. However, when color synchronizing bursts are present, no voltage will be developed at the output terminal 109 of the color killer 47. The potential furnished by the voltage divider 81 to the control grid 73 of the chroma amplifier 41 is adjusted to cause the first chroma amplifier 41 to amplify the chrominance signals furnished by the chroma filter 35.

In the color killer circuit 47 which was operated utilizing the circuit parameters which are included in Figure 1, the relationship between $V_c$ and percent of maximum burst amplitude shown in Figure 2, was obtained; maximum burst amplitude was set at 46 volts. It is seen that approximately −11 volts was developed by the color killer circuit 47 when the amplitude of the color synchronizing bursts was adjusted to zero.

The present invention provides an additional function which is of considerable use in color television receivers. The color killer circuit provides a negative voltage $V_c$ which is not only a function of the absence or the presence of the color synchronizing bursts, but also of the degree of phase synchronization of the local color oscillator. Should the local color oscillator fall out of phase synchronization, the color killer circuit will turn off the chrominance channel to result in only luminance signal reproduction on the color image reproducer. Accordingly, improper color reproduction due to out of phase synchronization of the local color oscillator is avoided.

Having described the invention, what is claimed is:

1. In a color television receiver, the combination of, a source of television signals which contain color synchronizing bursts during color transmission and in which signals there is an absence of said color synchronizing bursts during monochrome transmission, chrominance amplifier means, means to apply a selected frequency range of said television signals to said amplifier means, means coupled to said source for converting said color synchronizing bursts into a first continuous signal during color transmission, means for generating a second continuous signal during both color and monochrome transmission, means responsive to said first and second continuous signals to develop a reference signal indicative of the presence or the absence of said color synchronizing bursts, and means for utilizing said reference signal for disabling said amplifier means in the absence of said color synchronizing bursts.

2. In a color television receiver, the combination of, a source of television signals which include a chrominance signal and color synchronizing bursts during color transmission, a chrominance signal amplifier means, means to couple said source of said chrominance signal amplifier means, means coupled to said source for converting said color synchronizing bursts into a first continuous signal having prescribed frequency and phase, signal source means coupled to said burst converting means and including synchronizing means responsive to said color synchronizing bursts for utilizing said color synchronizing bursts to develop a second continuous signal having said prescribed frequency and phase when the synchronizing afforded by said synchronizing means is achieved, means for comparing the phase of said first and second continuous signals to develop a reference signal indicative of the phase relationship of the two signals, and means for utilizing said reference signal for disabling said chrominance signal amplifier means when the phase relationship between said first and second continuous signals deviates from a prescribed phase relationship.

3. In a transmission system, the combination of, a source of signals which include a prescribed signal in a frequency range of said signals during a first mode of operation and having the absence of said prescribed signal during a second mode of operation, chrominance amplifier means, means to couple said frequency range of said signals from said source to said amplifier means, means coupled to said source for converting said prescribed signal into a first continuous signal during said first mode of operation, means for generating a second continuous signal during both said first and said second modes of operation, means for comparing said first and second continuous signals to provide a reference signal indicative of either said first or second mode of operation, and means for utilizing said reference signal for disabling said amplifier means during said second mode of operation.

4. In a signalling system, the combination of, means adapted to receive incoming signals including synchronizing signals having prescribed frequency and phase characteristics during a first mode of transmission and wherein there is an absence of said synchronizing signals during a second mode of transmission, means coupled to said receiving means for converting said synchronizing signals when present into a continuous signal having said prescribed frequency and phase characteristics, a continuously operating signal source including apparatus coupled to said converting means to produce phase synchronization of said signal source by said continuous signal during said first mode of transmission for providing an output signal having said prescribed frequency and phase characteristics at least during said first mode of transmission, chrominance amplifier means operatively connected for amplifying at least a prescribed frequency range of said incoming signal, means operatively connected to be controlled by said output signal of said signal source and coupled to be responsive to the presence or absence of said continuous signal to develop a first control signal during said first mode of transmission and a second control signal during said second mode of transmission, and means for coupling said amplifier means to said electron control means whereby during said first mode of transmission, said first control signal causes said amplifier means to amplify, and during said second mode of transmission, said second control signal causes said amplifier means to cease amplifying.

5. In a color television receiver, the combination of, a source of signals wherein there are included synchronizing signals having predetermined timing and having prescribed frequency and phase characteristics during a first mode of transmission and wherein there is an absence of said synchronizing signals during a second mode of transmission, ringing circuit means coupled to said source for converting said synchronizing signals when present into ringing signals having said prescribed frequency and phase characteristics and duration intervals at least equal to the periods between synchronizing signals, a local oscillator signal source coupled to said ringing circuit means and responsive to be synchronized by said ringing signals when occurring for providing an output signal having said prescribed frequency and phase characteristics during said first mode of transmission and providing an output signal having free running frequency and phase characteristics during said second mode of transmission, chrominance amplifier means coupled to said source and operatively connected for amplifying at least a prescribed frequency range of said incoming signal, an electron control means responsive to said output signal of said oscillator and coupled to said ringing circuit means to provide electron flow in said electron control means only during said first mode of transmission whereby during said first mode of transmission a first control signal is produced and during said second mode of transmission a second control signal is produced, and means for coupling said amplifier means to said electron control means to cause the amplification of said amplifier means to be responsive to either said first or second control signal whereby during said first mode of transmission, said first control signal causes said amplifier means to amplify, and during said second mode of transmission, said second control signal causes said amplifier means to cease amplifying.

6. In a color television system, the combination of, a source of television signals which include color synchronizing bursts having prescribed frequency and phase when said television signal represents color television transmission and in which there is an absence of said color synchronizing bursts when said television signal describes monochrome transmission, means coupled to said source for converting each of said color synchronizing bursts when occurring into a substantially continuous signal having the phase and frequency of said color synchronizing burst and a duration interval at least equal to the period between said color synchronizing bursts, a signal source connected to said burst converting means and responsive to said color synchronizing burst when present for providing an output signal having the frequency and phase prescribed by said color synchronizing burst, and during the condition of monochrome transmission the output signal of said signal source is substantially free-running at a phase and frequency in the vicinity of said prescribed phase and frequency of said color synchronizing bursts, a chrominance amplifier means operatively connected to said source for amplifying at least a prescribed frequency range of said television signal, an electron control device having an electron flow, means coupling said electron control device to said burst converting means and to said signal source for causing said electron flow to be constantly controlled by the output signal of said signal source and by said continuous signal which is developed during color television transmission whereby when said color synchronizing burst is present the phasing between said output signal and said continuous signal is such that substantially no electron flow is produced in said electron control device and a first control signal is produced, and when said color synchronizing bursts are absent said output signal causes second control signal to be produced, and means for coupling said electron control device to said chrominance amplifier such that when said color synchronizing bursts are present, said first control signal adjusts the amplification provided by said chrominance amplifier to a first prescribed level and when said color synchronizing bursts are absent, said second control signal causes said chrominance amplifier to cease amplifying.

7. In a color television system, the combination of, a source of a television signal which includes color synchronizing bursts having prescribed frequency and phase when said television signal represents color television transmisison and in which there is an absence of said color synchronizing burst when said television signal described monochrome transmission, ringing circuit means coupled to said source for converting said color synchronizing bursts when present into a substantially continuous signal having the phase and frequency of said color synchronizing burst, a local oscillator signal source operatively connected to said ringing circuit means to be injection locked in phase by said continuous signal when present for providing an output signal having the frequency and phase prescribed by said color synchronizing burst during color television transmission and during the condition of monochrome transmission the output signal of said local oscillator is substantially free-running at a phase and frequency in the vicinity of said prescribed phase and frequency of said color synchronizing bursts, a chrominance amplifier means coupled to said source and including means for amplifying at least a prescribed frequency range of said color television signal, an electron control device having an electron flow coupled to said local oscillator and caused to be modulated by the output signal of said local oscillator and also coupled to said ringing circuit means and caused to be modulated by said continuous signal when present whereby when said color synchronizing burst is present no rectification of said output signal occurs and a first control signal is produced, and when said color synchronizing bursts are absent rectification of said output signal occurs and a second control signal is produced, and means for coupling said electron control device to said chrominance amplifier such that when said color synchronizing bursts are present, said first control signal adjusts said chrominance amplifier to amplify said prescribed frequency range of said color television signal and when said color synchronizing bursts are absent, said second control signal disables said chrominance amplifier for effective signal amplification.

8. In a color television receiver, the combination of, means adapted to receive an incoming television signal which includes color synchronizing bursts having a prescribed frequency and phase when said television signal represents color television transmission and wherein there is an absence of said color synchronizing burst when said television signal described monochrome transmission, piezoelectric crystal ringing circuit means coupled to said source for converting said color synchronizing bursts when present into a substantially continuous signal having the phase and frequency of said color synchronizing burst, a local oscillator signal source coupled to said ringing circuit and responsive to said color synchronizing burst when present for providing an output signal having the frequency and phase prescribed by said color synchronizing burst, and during the condition of monochrome transmission the output signal of said local oscillator is substantially free-running at a phase and frequency in the vicinity of said prescribed phase and frequency of said color synchronizing bursts, a chrominance amplifier means for amplifying at least a prescribed frequency range of said color television signal, an electron flow device means having an electron flow modulated by the output signal of said local oscillator and including an output circuit coupled to said piezoelectric crystal ringing circuit means for causing said electron flow to also be modulated by said continuous signal when present whereby when said color synchronizing burst is present a first prescribed electron flow occurs in said electron flow device and a first control signal is produced in said output circuit, and when said color synchronizing bursts are absent a second prescribed electron flow occurs in said electron flow device and a second control signal is produced in said output circuit, means for coupling said output circuit of said electron control device to said chrominance amplifier whereby when said color synchronizing bursts are present, said first control signal adjusts the amplification provided by said chrominance amplifier to a prescribed level and when said color synchronizing bursts are absent, said second control signal disables said chrominance amplifier for effective amplification of said prescribed frequency range of said color television signal.

9. In a color television receiver, a color killer circuit comprising in combination, a source of a television signal wherein color synchronizing bursts having prescribed frequency and phase characteristics are included with said television signal during color transmission and when said television signal describes a monochrome signal no color synchronizing bursts accompany said television signal, a chrominance amplifier coupled to said source and having at least a gain control means for amplifying a predetermined frequency range of said television signal, burst separation and ringing circuit means including apparatus for separating said color synchronizing bursts from said color television signal and converting said bursts into a substantially continuous signal having the frequency and phase of said color synchronizing bursts when said color synchronizing bursts are present, a local oscillator coupled to said burst separation and ringing circuit means and including apparatus responsive to said continuous signal when present for synchronizing the output of said local oscillator in phase and frequency to a phase and frequency prescribed by said color synchronizing burst during the presence of said color synchronizing bursts and when said color synchronizing bursts are not present the output signal of said local oscillator corresponds to a free-running oscillator signal at a frequency and phase not necessarily the frequency and phase of said color synchronizing bursts, an electron control device having at least a cathode and a control electrode, means for coupling said burst separator and ringing circuit means to said cathode, means for coupling the output signal of said local oscillator to said control electrode, grid leak means also coupled to said control grid whereby when said continuous signal is present said continuous signal and the output signal of said local oscillator are in phase and said control electrode does not draw current thereby not producing a bias across said grid leak means and when said continuous signal is absent said control grid is caused to draw current on the peaks of the output signal furnished by said local oscillator thereby causing said grid leak circuit to develop a bias voltage indicative of the absence of said color synchronizing burst, and means for coupling said grid leak means to said gain control means of said chrominance amplifier to cause said bias voltage to control the gain of said chrominance amplifier.

10. In a color television receiver, the combination of, a source of television signals which contain both a chrominance signal and color synchronizing bursts in a higher frequency range of the television signals during a color transmission and in which television signals there is an absence of said chrominance signal and color synchronizing bursts during monochrome transmission, chrominance amplifier means, means for applying said higher frequency range of said television signal to said amplifier means, means for converting said color synchronizing bursts into a first continuous signal during color transmission, means for generating a second continuous signal during both color and monochrome transmission, said second signal generating means including synchronizing means coupled to said burst converting means and responsive to said color synchronizing bursts when present to phase synchronize said second signal to a phase prescribed by said bursts during color transmission, means for comparing said first and second continuous signals to provide a reference signal whose amplitude is indicative of either color or monochrome transmission, and means for utilizing said reference signal for reducing the amplification of said amplifier means for predetermined amplitudes of said reference signal.

References Cited in the file of this patent

UNITED STATES PATENTS

| | | |
|---|---|---|
| 2,681,379 | Schroeder | June 15, 1954 |
| 2,752,417 | Pritchard | June 26, 1956 |
| 2,790,846 | Keizer | Apr. 30, 1957 |
| 2,835,728 | Flood | May 20, 1958 |
| 2,835,729 | Flood | May 20, 1958 |
| 2,841,642 | Richman | July 1, 1958 |
| 2,841,643 | Loughlin | July 1, 1958 |

OTHER REFERENCES

Introduction to Color, Admiral Corporation, February 1954, page 36, 38A1 Chassis.